UNITED STATES PATENT OFFICE.

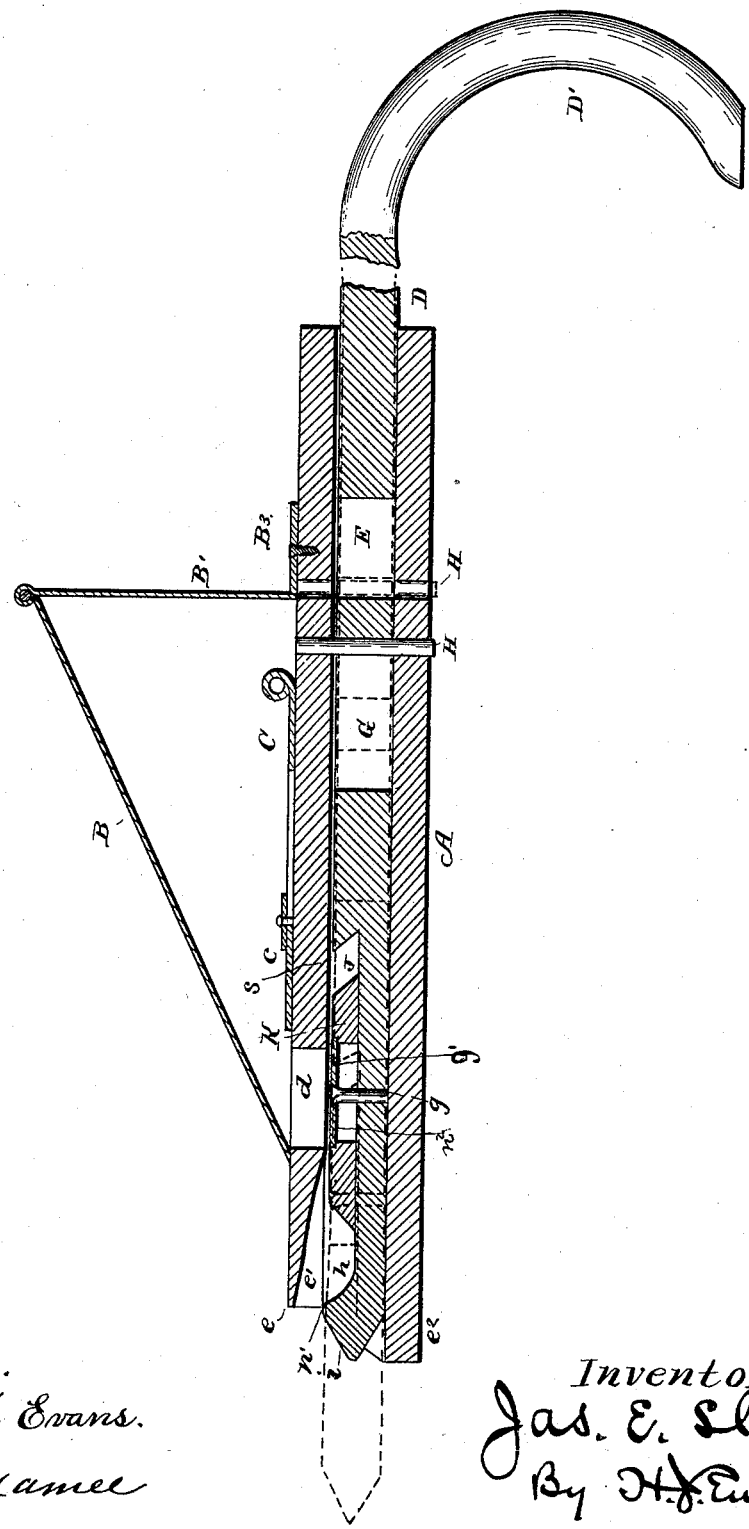

JAMES E. SHAW, OF BISHOPVILLE, SOUTH CAROLINA, ASSIGNOR OF ONE-HALF TO LAUCHLIN McKINNON, OF LINCHWOOD, NORTH CAROLINA.

HAND SEED-PLANTER.

SPECIFICATION forming part of Letters Patent No. 399,938, dated March 19, 1889.

Application filed October 20, 1888. Serial No. 288,636. (No model.)

*To all whom it may concern:*

Be it known that I, JAMES E. SHAW, a citizen of the United States, residing at Bishopville, in the county of Sumter and State of South Carolina, have invented certain new and useful Improvements in Hand Seed-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain novel improvements in hand implements for dropping seed, especially corn and peas, which improvements will be fully understood from the following description and claim taken in connection with the annexed drawing, in which I have illustrated a vertical longitudinal section through my improved implement, showing the dropper-rod in position for allowing the escape of a charge of seed, the dotted lines indicating a modification of the dropper-rod adapted for dibbling.

Referring to the annexed drawing by letters, A designates the sheath of the implement, which is preferably rectangular in cross-section, and which may be made of any suitable length. To this sheath is rigidly secured a hopper, B, having a hinged cover, B', provided with a turn-button, B². This sheath A is perforated at $d$ for the purpose of allowing the seed to be discharged from said hopper regulated by the cut-off.

C designates a sliding gate or cut-off, which is designed for graduating and also for closing the aperture $d$ when the implement is not in operative condition. At the lower end of the front wall of the sheath A is an interiorly-beveled surface, $e$, which forms a downwardly-flaring discharge-passage, $e'$, through which the charges of seed (corn or peas) are allowed to escape from the implement. The rear wall of the sheath A extends below the point of discharge, and the side walls are beveled thereto, thus affording a foot-piece for the implement when it is used without a dibbling-staff and a stop when used with a dibbler, as will be hereinafter further explained.

D designates the dropper rod or staff, which is provided with a handle, D'. This staff is applied within the sheath A, so that the latter is free to slide on it during the dropping movement. The staff or dropper-rod is slotted at E and at G. This dropper-rod is also provided with a beveled shoulder, $s$, which is formed by scarfing out one side of it, the scarfing terminating in a nose, $m'$, which is double-beveled at $i$, forming a recess at $h$ by reason of reducing the staff.

K designates a graduating-slide, which is practically a cut-off and provided with beveled ends. This slide is slotted vertically at $g'$ and adjustably secured to the staff by a set-screw, $g$. The slot through the said slide should be covered by a plate, $n^2$, so that none of the grains of seed will find lodgment therein during the passage of the slot by the aperture $d$. Now, it will be observed that I have applied to the staff an adjustable cut-off, which, by regulating the strokes of the sheath and by transferring the pin H from the position shown in full lines to the position shown in dotted lines, will regulate the throw of the implement for planting different seeds or for planting one kind of seed with different charges. It will also be observed that I have in addition to this adjustment a cut-off adjustment, by means of which I am able to adapt the machine for use with both corn and peas where different charges are necessary. Finally, it will be observed that by simply extending the pointed end of the staff, as indicated in dotted lines, the implement is converted into a dibbler for deep planting.

Having thus described my invention, what I claim is—

The combination, in a seed-dropper, of a sheath provided with a hopper, a flaring discharge-passage, $e'$, a discharge-aperture, $d$, a sliding cut-off therefor, and an extended foot, $e^2$, a staff or dropper-rod, D, recessed, as described, and provided in this recess with a double-beveled adjustable and slotted cut-off, the plate $n^2$, for closing the slot in this cut-off, the said staff having slots E G, the removable pin H, and the double-beveled nose, all constructed and adapted to operate as specified.

In testimony whereof I affix my signature in presence of two witnesses.

JAS. E. SHAW.

Witnesses:
H. J. ENNIS,
J. McNAMEE.